Figure 1:
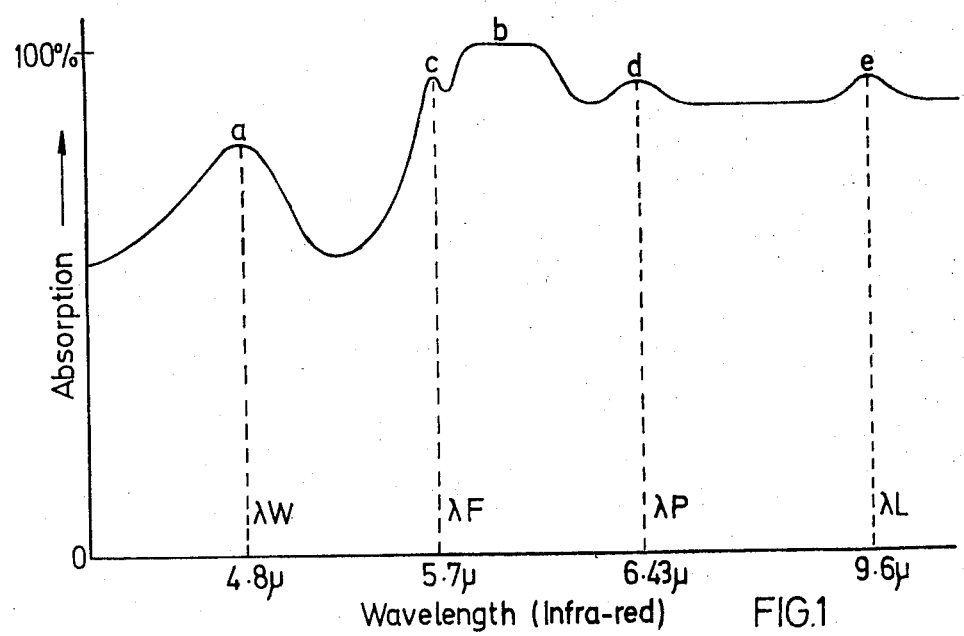

United States Patent

McKenna et al.

[11] 3,839,633
[45] Oct. 1, 1974

[54] ANALYSIS OF EMULSIONS AND SUSPENSIONS

[75] Inventors: David McKenna; Joseph Hopkins; Geoffrey Hall, all of Newcastle upon Tyne, England

[73] Assignee: Sir Howard Grubb Parsons & Company Limited, Walkergate, Newcastle upon Tyne, England

[22] Filed: Aug. 6, 1973

[21] Appl. No.: 385,866

[30] Foreign Application Priority Data
Aug. 4, 1972   Great Britain .................... 36547/72

[52] U.S. Cl. ............................................. 250/343
[51] Int. Cl. .......................................... G01r 21/26
[58] Field of Search ............ 250/343, 344, 395, 346

[56] References Cited
FOREIGN PATENTS OR APPLICATIONS
989,617   4/1965   Great Britain

*Primary Examiner*—James W. Lawrence
*Assistant Examiner*—C. E. Church
*Attorney, Agent, or Firm*—Holman & Stern

[57] ABSTRACT

A method for the quantitative estimation of the dispersion medium and one or more components forming the disperse phase of an emulsion or suspension or mixture thereof, wherein the mean particle size of the disperse phase is less than a selected peak absorption wavelength of the dispersion medium and also less than a selected peak absorption wavelength for each of one or more components of the disperse phase, and the said selected peak absorption wavelength of the dispersion medium is at a wavelength differing substantially from the or each selected peak absorption wavelength for the disperse phase component or components and the absorption by the or each disperse phase component is stronger than the absorption by the dispersion medium at the selected peak absorption wavelength for the or each disperse phase component, said method comprising the steps of:

a. Passing a first beam from a source of infra-red radiation through a sample of the emulsion or suspension of mixture thereof to be analysed, and a second beam of the said radiation through a reference sample of the dispersion medium, b. Selecting a narrow range of wave-length of radiation from the two beams containing the selected peak absorption wave-length of the dispersion medium and effecting a balance in the radiant energy absorption between the first and second beams in this range of wave-length by adjusting the path length of the second beam through the reference sample of dispersion medium, c. Selecting a narrow range of wave-length of radiation from the two beams containing the selected peak absorption wave-length of a component of the disperse phase, d. Measuring the content of the component of the disperse phase corresponding to the wave-length selected in (c) in terms of the imbalance in radiant energy absorption between the first and second beams, e. Repeating steps (c) and (d) using a different narrow range of wave-length of radiation for each selected peak absorption wave-length of the remaining components of the disperse phase, f. Re-selecting a narrow range of wave-length of radiation from the two beams containing the selected peak absorption wave-length of the dispersion medium whilst maintaining the path length of radiation through the reference sample of dispersion medium in the second beam at the same value as at the end of step (d), and g. Ascertaining the content of dispersion medium in the sample being analysed by replacing this sample in the first beam by the dispersion medium and measuring the imbalance in radiant energy absorption between the first and second beams to determine the total content of the disperse phase component or components in the sample being analysed.

11 Claims, 6 Drawing Figures

ANALYSIS OF EMULSIONS AND SUSPENSIONS

This invention relates to the analysis of emulsions and suspensions by means of infra-red absorption methods.

In British Patent Specification No. 989,617, a method of analysing emulsions and suspensions is described which is concerned with infra-red absorption techniques for estimation of the disperse phase in emulsions or suspensions or mixtures thereof, together with apparatus for carrying out the method. The method described is particularly suitable for analysis of a plurality of samples of a fluid having the same disperse phase components in differing amounts but in which each sample contains substantially the same proportion of dispersion medium.

Thus, whilst the method disclosed in the above-mentioned specification is well suited to the analysis of a plurality of samples of, for example, homogenised milk, the method is not readily adapted to analysing samples of a fluid having the same disperse phase components in differing amounts but in which each sample contains differing proportions of dispersion medium.

The objects of the present invention are to extend the scope of the method disclosed in British Patent Specification No. 989,617 and to provide apparatus for carrying into effect the novel method thus yielded.

The present invention consists in a method for the quantitative estimation of the dispersion medium and one or more components forming the disperse phase of an emulsion or suspension of mixture thereof, wherein the mean particle size of the disperse phase is less than a selected peak absorption wavelength of the dispersion medium and also less than a selected peak absorption wavelength for each of one or more components of the disperse phase, and the said selected peak absorption wavelength of the dispersion medium is at a wavelength differing substantially from the or each selected peak absorption wavelength for the disperse phase component or components and the absorption by the or each disperse phase component is stronger than the absorption by the dispersion medium at the selected peak absorption wavelength for the or each disperse phase component, said method comprising the steps of:

a. Passing a first beam of radiation from a source of infra-red radiation through a sample of the emulsion or suspension or mixture thereof to be analysed, and a second beam of the said radiation through a reference sample of the dispersion medium, b. Selecting a narrow range of wave-length of radiation from the two beams containing the selected peak absorption wave-length of the dispersion medium and effecting a balance in the radiant energy absorption between the first and second beams in this range of wave-length by adjusting the path length of the second beam through the reference sample of dispersion medium, c. Selecting a narrow range of wave-length of radiation from the two beams containing the selected peak absorption wave-length of a component of the disperse phase, d. Measuring the contact of the component of the disperse phase corresponding to the wave-length selected in (c) in terms of the imbalance in radiant energy absorption between the first and second beams, e. Repeating steps (c) and (d) using a different narrow range of wave-length of radiation for each selected peak absorption wave-length of the remaining components of the disperse phase, f. Re-selecting a narrow range of wave-length of radiation from the two beams containing the selected peak absorption wave-length of the dispersion medium whilst maintaining the path length of radiation through the reference sample of dispersion medium in the second beam at the same value as at the end of step (b), and g. Ascertaining the content of dispersion medium in the sample being analysed by replacing this sample in the first beam by the dispersion medium and measuring the imbalance in radiant energy absorption between the first and second beams to determine the total content of the disperse phase component or components in the sample being analysed.

The invention also consists in apparatus for carrying out the method described in the preceding paragraph, the said apparatus being of the double beam spectrometer type in which a first beam of radiation from a common source may be directed through a first cell containing a sample to be analysed and a second beam of radiation from the source may be directed through a second cell containing a reference sample, characterised in that the second cell is provided with means whereby the optical path length of the second beam through the cell may be adjusted subsequent to initial null balancing of the spectrometer.

The invention also consists in apparatus in accordance with the preceding paragraph in which the second cell is provided with drive means whereby adjustment of path length may be achieved automatically.

The invention also consists in apparatus as claimed in the preceding paragraph in which the drive means forms part of a servomechanism whereby balance of the absorption of radiation in the two beam paths of the spectrometer may be achieved automatically.

The invention also consists in apparatus as claimed in the first of the preceding three paragraphs in which wave-length selection means in the form of narrow pass filters are provided.

The invention also consists in apparatus as claimed in the first of the preceding four paragraphs in which rotary shutter beam chopping means for the first and second beams are provided optically in advance of the first and second cells.

The invention also consists in apparatus as claimed in the first of the preceding five paragraphs in which stationary beam re-combination means are provided comprising a semi-transmitting, semi-reflecting, optical element.

The invention also consists in apparatus as claimed in the first of the preceding six paragraphs in which the first and second cells are mounted in a common cell block, the cell block being provided with temperature stabilisation means comprising a circulating fluid system and further being provided with means whereby sample fluid for analysis passing to the first cell is brought into heat exchange relationship with the circulating fluid prior to entering the cell.

The invention also consists in apparatus as claimed in the first of the preceding seven paragraphs in which measurement of imbalance between absorption of radiation in the two paths is effected by a ratio technique, said apparatus comprising a rotating disc shutter having an effective quadrant aperture arranged to chop the two beams alternately, a detector to receive the resultant composite optical signal subsequent to re-combination of the beams, and electronic emplifying and shaping means fed from the detector and acting to separate reference and sample signals into two d.c. levels respectively proportional to the intensity in the beam paths prior to re-combination.

The invention also consists in apparatus as claimed in the preceding paragraph in which the imbalance is indicated by a meter responsive to the logarithm of the ratio of the said two d.c. levels.

The invention also consists in apparatus as claimed in the first of the preceding two paragraphs in which a servomechanism for restoring imbalance of the beam paths comprises sample and hold electronic circuitry capable of producing from the said two d.c. levels a square wave signal proportional in amplitude to the intensity difference in the two beams, and amplification and synchronous rectification means for producing a driving control signal for a servo-motor and tachometer arrangement associated with the variable path length second cell.

Figure 2:
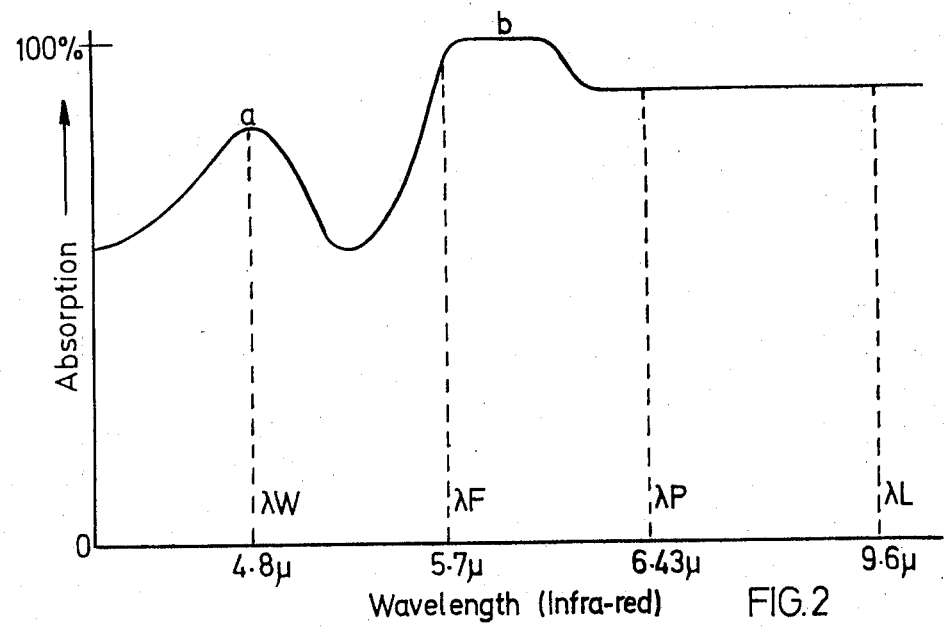

The invention also consists in a method for the quantitative estimation of the dispersion medium and one or more components forming the disperse phase of an emulsion or suspension or mixture thereof, substantially as described herein and with reference to FIGS. 1 and 2 of the accompanying drawings.

The invention also consists in apparatus for carrying out the method of the previous paragraph substantially as described herein and with reference to FIGS. 3 to 6 of the accompanying drawings.

Figure 3:
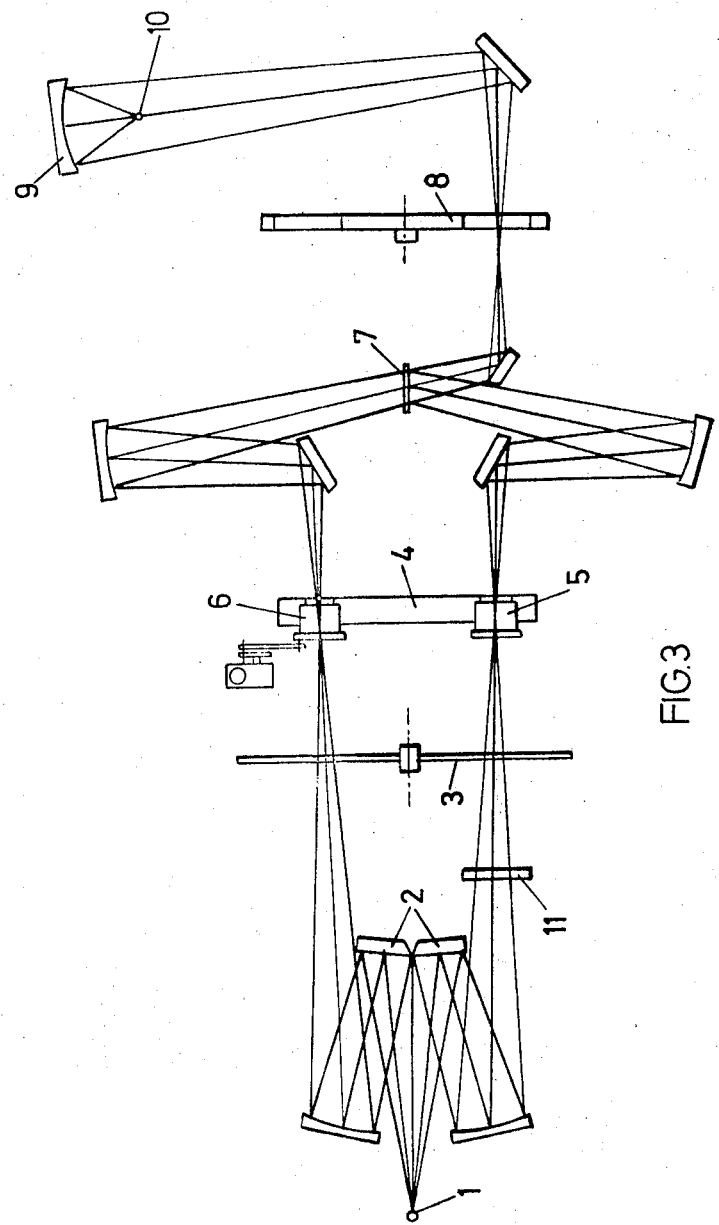
Figure 4:
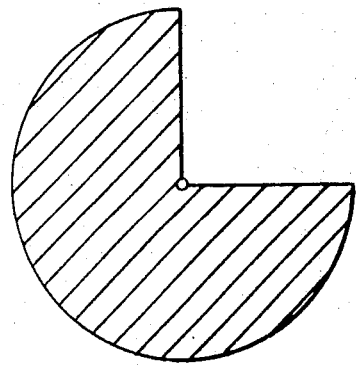
Figure 5:
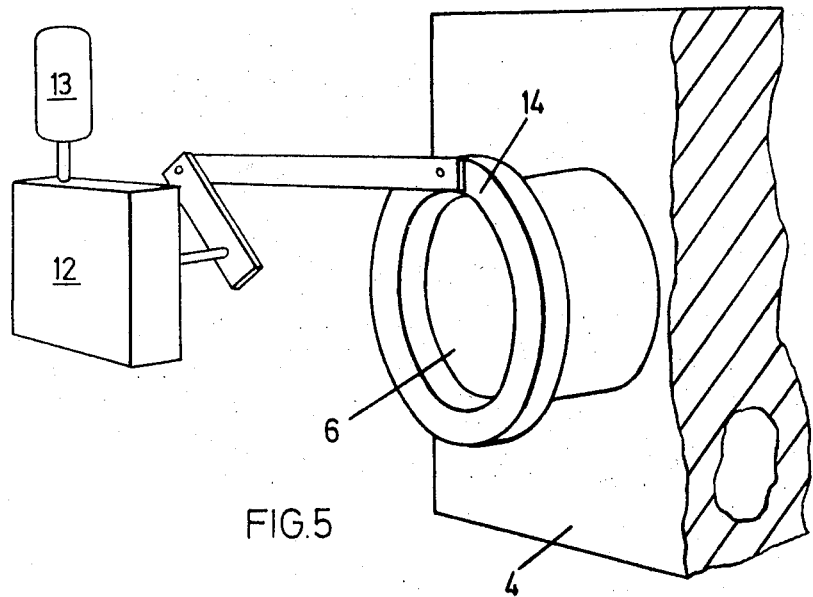
Figure 6:
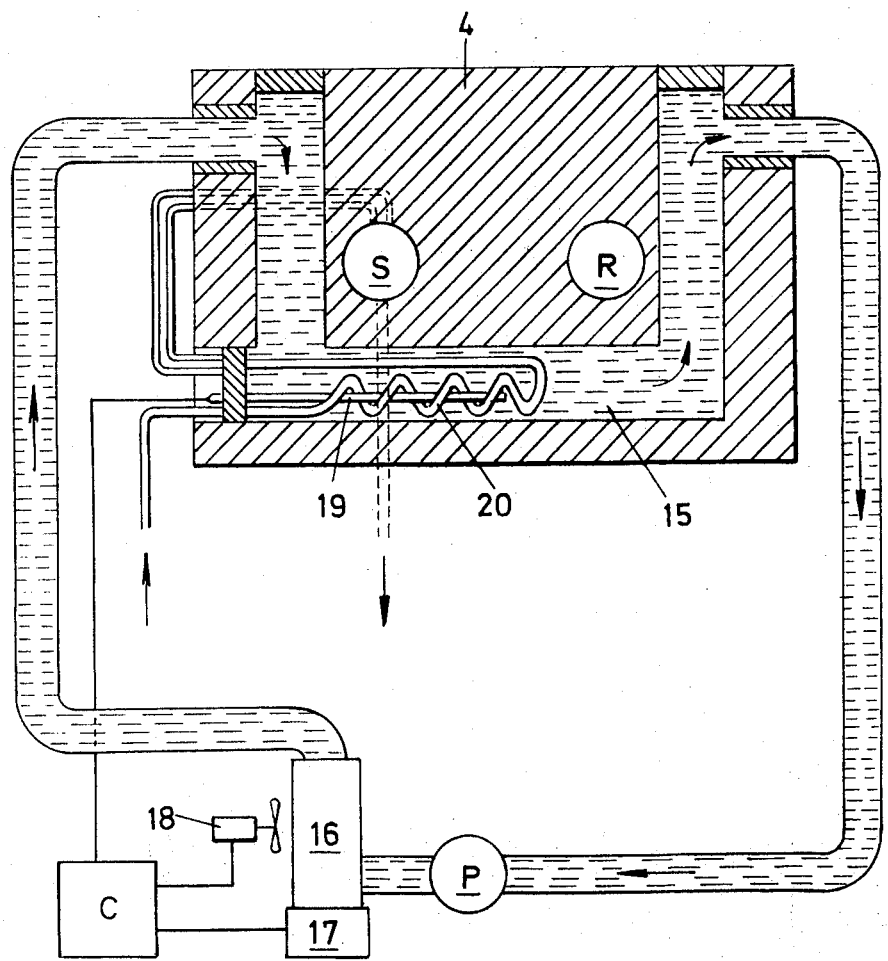

Referring to the aforesaid drawings,

FIG. 1 shows an infra-red spectrum for a milk sample suitable for analysis by the method according to the invention, FIG. 2 shows an infra-red spectrum for water, FIG. 3 is a simplified plan view of the optical system for spectrometer apparatus in accordance with the present invention, FIG. 4 shows a profile of a beam chopping device used in the apparatus shown in FIG. 3, FIG. 5 is a simplified view of drive means for a variable path length cell included in the apparatus shown in FIG. 3, and FIG. 6 is a sectional view of a cell containing block and temperature stabilization arrangement included in the apparatus shown in FIG. 2.

The scope and nature of the invention will now be further made clear by the following description with reference to the aforesaid drawings.

Referring to FIG. 1, the infra-red spectrum shown is that obtained for a homogenized milk sample in one beam path of an analyser of the double beam spectrometer type when the other sample path contains air only. A similar spectrum for water alone is shown in FIG. 2. It will be noted that the peaks $a$ and $b$, common to both FIGS. 1 and 2, correspond to the water and thus the peaks at $c, d, e$, in FIG. 1 are due to the fat, protein and lactose content of the milk. In British Patent No. 989,617, the components at peaks $c$, $d$, and $e$ are read by readout circuits in an arrangement where the sample to be analysed is in one cell and water is placed in a further cell in a comparison beam path of infra-red radiation.

In the prior arrangement the method does not call for measurement of the water content of each sample and the usefulness of the prior arrangement depends on examining a number of samples, each of which has substantially the same water content. The reason for this is that the absorption by water in the sample cell containing milk differs from the absorption in the comparison cell containing water alone, and the instruments must initially be set to equalise the water absorption in the cells in order that the absorption of the other components may be measured. In accordance with an embodiment of the present invention an actual measurement of water content will also be made by use of an absorption wave-length band in the region of the spectrum shown in FIG. 1, and in order to do this a comparison cell with a variable path length is arranged in the instrument. Variable path length cells are known in optical analysing instruments, and achieve the variation by movement of the opposing containing walls of the cell. However, in known arrangements, such variation has only been used to achieve an initial null position for an instrument, and a variation of the cell path length from sample to sample is not provided for. In the present arrangement, the variation in the cell path length, which may be achieved by movement of the cell walls, is obtained either automatically or by manual adjustment from a signal at the analyser output for each sample analysed.

In the method disclosed in British Patent 989,617 it is required to use computerised calculation of results to eliminate errors caused by variations in the amount of dispersion medium. Even when variations in the amount of dispersion medium are small it is necessary to use a statistical method to determine the required adjustments to the electronic readout values. With the new method and arrangement, such calculations are rendered unnecessary.

The method in accordance with the present invention may thus be readily applied to food product samples including, in addition to dairy milk, fluids such as condensed and evaporated milk having highly different water contents to dairy milk, a wide range of beverages, and food product samples which include protein and other solids in suspension form. In some cases, e.g. milk, it will be necessary to pre-treat the liquid in a homogenizer, (such as is disclosed in U.K. Patent No. 1,174,916 and U.S. Pat. No. 3,495,807) in order to achieve the required mean particle size of the disperse phase, but in other cases, e.g. evaporated milk this treatment may not be necessary.

Referring to FIG. 3, apparatus for carrying out the method according to the invention comprises a double beam infra-red spectrometer including an infra-red source 1, a beam splitting mirror arrangement 2, a rotating chopper 3 for interrupting the beams alternately, a cell block 4 containing a sample cell 5 for the fluid to be analysed through which a first beam path of radiation passes and a reference sample cell 6 through which the second beam passes, a semi-transmitting semi-reflecting disc 7 for beam re-combination, an interference filter selection disc 8, a focusing mirror 9 and a detector 10. An optical attenuator 11 is included in one of the beam paths.

The rotating beam chopping disc 3 preferably takes the shape shown in FIG. 4 and is situated optically in advance of the sample and reference cells to eliminate errors due to re-radiation from the sample and other signals from optical components. The shape of disc shown provides alternate optical signals to the detector from each beam, there being a dark space between each signal corresponding to a quarter revolution of the chopping disc.

The method of analysis according to the present invention will now be described as carried out using the apparatus shown in FIG. 3 to analyse a sample of dairy milk. Features of the apparatus according to the present invention will also be more readily understood from this description.

a. Prior to operation of the apparatus, the cell block 4 is removed and an optical balance in the beam paths is achieved using a suitable wave-length selected by an interference filter on the rotating disc 8, for example a wave-length of $4.8\mu$, by adjusting the attenuator 11.

b. The cell block 4 is then replaced and both the sample and reference cells are filled with water, the dispersing medium of the milk sample. Optical balance at the same wave-length as for step (a) is then achieved by varying the path length through reference cell 6. Balance of the instrument for all wave-lengths should now exist, and this may be checked at this stage by introducing different filters on the disc 8 into the re-combined beam path.

c. At a selected wave-length of $4.8\mu$ for the apparatus, the sample of milk to be analysed is introduced into the sample cell 5, resulting in imbalance between the beam path absorption through the apparatus.

d. Maintaining the selected wave-length at $4.8\mu$, the spectrometer beam paths are balanced by adjusting the path length through reference cell 6.

e. The selected wave-length for the lactose component of the disperse phase, $9.6\mu$, is next chosen on the disc 8, resulting in imbalance between the beam paths. The lactose content of the sample is read out from the spectrometer in terms of this imbalance.

f. The selected wave-length for the protein component of the disperse phase, $6.4\mu$, is next chosen on the disc 8, and the protein content is determined from the imbalance of the sepctrometer, as in step (e).

g. The content of the fat component of the disperse phase is determined, as in steps (e) and (f), using the wave-length selector 8 at $5.7\mu$.

h. The sample of milk is replaced by water in the sample cell, and, setting the wave-length selector 8 again at $4.8\mu$, the imbalance of the spectrometer is read to indicate the total content of disperse phase components in the sample, the water content of the sample thus being determined.

In preferred apparatus of the type indicated in FIG. 3, the sequence of operation is carried out automatically and, to this end, a servo-drive arrangement for the variable path-length cell 6 is provided. FIG. 5 shows the general arrangement of a servo-motor 12 and tachogenerator 13 for driving cell 6, rotation of the flange 14 causing variation in path length by a screw-thread arrangement in the cell.

Temperature stabilisation for the sample and reference cells is provided by using a circulating water system through cell block 4 as shown in FIG. 6. Water is circulated by a pump P through a duct system 15 in the block, the sample and reference cells in which are denoted by references S and R, respectively. A radiator 16 is provided with a heater 17 and cooling fan 18, these being controlled by a controller C connected to a temperature probe 19 in the duct system. A further feature of the arrangement is that pre-conditioning of the sample prior to its entry into cell S is achieved by passing it via a coiled tube 20 disposed in the duct system.

Wave-length selection in the spectrometer is effected by a disc 8 containing a plurality of narrow pass filters, preferably interference filters, for wave-lengths corresponding to the selected peak absorption wave-lengths of the disperse phase components and the dispersion medium of the sample under analysis. The apparatus is thus readily adapted for analysis of samples of differing constituents by replacing disc 8 by a similar disc having the necessary range of filters required.

The optical attenuator 11 is preferably in the form of an adjustable pitch coil spring disposed in the beam path, as disclosed in our co-pending British patent application No. 6961/73.

Re-combination of the beams is achieved using a partially-transmitting, partially-reflecting plate 7, for example of the coated germanium substrate type, in which the proportions of reflection and transmission for the incident beams are close to 50% in each case.

Imbalance of the spectrometer is determined from the chopped wave signal received at detector 10 in the following manner. The reference and sample signals in the composite signal from the detector are electronically separated into two d.c. levels, these levels being proportional to the intensity in the corresponding beams. The logarithm of the ratio of these two d.c. levels is determined by analogue methods and the result is presented on a digital meter indicating the amount of imbalance.

The servo-system for automatic balancing of the spectrometer using the varying path length reference cell derives its error signal from the two d.c. levels mentioned above using a sample and hold technique. A sampling capacitor is used to develop a square wave signal based on the difference between d.c. levels, the amplitude of the square wave being proportional to the intensity difference in the two beams. This signal is amplified and synchronously rectified to provide the driving signal for the servo-motor 12.

We claim:

1. A method for the quantitative estimation of the dispersion medium and one or more components forming the disperse phase of an emulsion or suspension or mixture thereof, wherein the mean particle size of the disperse phase is less than a selected peak absorption wavelength of the dispersion medium and also less than a selected peak absorption wavelength for each of one or more components of the disperse phase, and the said selected peak absorption wavelength of the dispersion medium is at a wavelength differing substantially from the or each selected peak absorption wavelength for the disperse phase component or components and the absorption by the or each disperse phase component is stronger than the absorption by the dispersion medium at the selected peak absorption wavelength for the or each disperse phase component, said method comprising the steps of:

a. Passing a first beam from a source of infra-red radiation through a sample of the emulsion or suspension or mixture thereof to be analysed, and a second beam of the said radiation through a reference sample of the dispersion medium, b. Selecting a narrow range of wave-length of radiation from the two beams containing the selected peak absorption wave-length of the dispersion medium and effecting a balance in the radiant energy absorption between the first and second beams in this range of wave-length by adjusting the path length of the second beam through the reference sample of dispersion medium, c. Selecting a narrow range of wave-length of radiation from the two beams containing the selected peak absorption wave-length of a component of the disperse phase, d. Measuring the content of the component of the disperse phase corresponding to the wave-length selected in (c) in terms of the imbalance in radiant energy absorption between the first and second beams, e. Repeating steps (c) and (d) using a different narrow range of wave-length of radiation for each selected peak absorption wave-length of the remaining components of the disperse phase, f. Re-selecting a narrow range of wave-length of radiation from the two beams containing the selected peak absorption wave-length of the dispersion medium whilst maintaining the path length of radiation through the reference sample of dispersion medium in the second beam at the same value as at the end of step (d), and g. Ascertaining the content of dispersion medium in the sample being analysed by replacing this sample in the first beam by the dispersion medium and measuring the imbalance in radiant energy absorption between the first and second beams to determine the total content of the disperse phase component or components in the sample being analysed.

2. Apparatus for carrying out the method of claim 1, said apparatus being of the double beam spectrometer type in which a first beam of radiation from a common source may be directed through a first cell containing a sample to be analysed and a second beam of radiation from the source may be directed through a second cell containing a reference sample, characterised in that the second cell is provided with means whereby the optical path length of the second beam through the cell may be adjusted subsequent to initial null balancing of the spectrometer.

3. Apparatus as claimed in claim 2 in which the second cell is provided with drive means whereby adjustment of path length may be achieved automatically.

4. Apparatus as claimed in claim 3 in which the drive means forms part of a servomechanism whereby balance of the absorption of radiation in the two beam paths of the spectrometer may be achieved automatically.

5. Apparatus as claimed in claim 2 in which wave-length selection means in the form of narrow pass filters are provided.

6. Apparatus as claimed in claim 2 in which rotary shutter beam chopping means for the first and second beams are provided optically in advance of the first and second cells.

7. Apparatus as claimed in claim 2 in which stationary beam re-combination means are provided comprising a semi-transmitting, semi-reflecting, optical element.

8. Apparatus as claimed in claim 2 in which the first and second cells are mounted in a common cell block, the cell block being provided with temperature stabilisation means comprising a circulating fluid system and further being provided with means whereby sample fluid for analysis passing to the first cell is brought into heat exchange relationship with the circulating fluid prior to entering the cell.

9. Apparatus as claimed in claim 2 in which measurement of imbalance between absorption of radiation in the two paths is effected by a ratio technique, said apparatus comprising a rotating disc shutter having an effective quadrant aperture arranged to chop the two beams alternately, a detector to receive the resultant composite optical signal subsequent to re-combination of the beams, and electronic amplifying and shaping means fed from the detector and acting to separate reference and sample signals into two d.c. levels respectively proportional to the intensity in the beam paths prior to recombination.

10. Apparatus as claimed in claim 9 in which the imbalance is indicated by a meter responsive to the logarithm of the ratio of the said two d.c. levels.

11. Apparatus as claimed in claim 9 in which a servomechanism for restoring imbalance of the beam paths comprises sample and hold electronic circuitry capable of producing from the said two d.c. levels a square wave signal proportional in amplitude to the intensity difference in the two beams, and amplification and synchronous rectification means for producing a driving control signal for a servo-motor and tachometer arrangement associated with the variable path length second cell.

* * * * *